United States Patent
Velev et al.

(10) Patent No.: US 11,553,559 B2
(45) Date of Patent: Jan. 10, 2023

(54) SESSION MANAGEMENT FUNCTION DERIVED CORE NETWORK ASSISTED RADIO ACCESS NETWORK PARAMETERS

(71) Applicant: Lenovo (Singapore) PTE. LTD., New Tech Park (SG)

(72) Inventors: Genadi Velev, Darmstadt (DE); Joachim Loehr, Wiesbaden (DE); Prateek Basu Mallick, Dreieich (DE); Ravi Kuchibhotla, Clarendon Hills, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 25 days.

(21) Appl. No.: 16/834,542

(22) Filed: Mar. 30, 2020

(65) Prior Publication Data

US 2020/0314955 A1   Oct. 1, 2020

Related U.S. Application Data

(60) Provisional application No. 62/826,598, filed on Mar. 29, 2019.

(51) Int. Cl.
*H04W 4/00* (2018.01)
*H04W 80/10* (2009.01)
*H04W 76/11* (2018.01)
*H04W 8/08* (2009.01)
*H04W 48/16* (2009.01)

(52) U.S. Cl.
CPC ............. *H04W 80/10* (2013.01); *H04W 8/08* (2013.01); *H04W 48/16* (2013.01); *H04W 76/11* (2018.02)

(58) Field of Classification Search
CPC ....... H04W 80/10; H04W 8/08; H04W 28/04; H04W 72/04; H04W 72/042; H04W 76/01; H04W 48/16; H04W 88/08; H04L 5/0007
USPC .......................................................... 370/329
See application file for complete search history.

(56) References Cited

U.S. PATENT DOCUMENTS

| | | | |
|---|---|---|---|
| 2018/0199398 A1* | 7/2018 | Dao | .................... H04L 41/0806 |
| 2018/0227872 A1 | 8/2018 | Li et al. | |
| 2020/0162255 A1* | 5/2020 | Hunt | ........................ G06F 21/31 |
| 2020/0260384 A1* | 8/2020 | Ryu | .................. H04W 52/0261 |

OTHER PUBLICATIONS

PCT/IB2020/000238, "Notification of Transmittal of the International Search Report and the written Opinion of the International Searching Authority, or the Declaration" PCT, dated Jun. 16, 2020, pp. 1-11.

(Continued)

*Primary Examiner* — Temica M Beamer
(74) *Attorney, Agent, or Firm* — Kunzler Bean & Adamson

(57) ABSTRACT

Apparatuses, methods, and systems are disclosed for session management function derived core network assisted radio access network parameters. One method includes receiving session management function derived core network assisted radio access network parameters from a session management function. The method includes storing the session management function derived core network assisted radio access network parameters in a protocol data unit session level context. The method includes using the session management function derived core network assisted radio access network parameters to determine an expected session activity behavior parameter set.

16 Claims, 8 Drawing Sheets

(56) References Cited

OTHER PUBLICATIONS

Motorola Mobility et al., "External parameters provisioning to the 5GS", 3GPP TSG-SA WG2 Meeting #130 52-1900647, Jan. 21-25, 2019, pp. 1-6.

Motorola Mobility et al., "External parameters provisioning to the 5GS", 3GPP TSG-SA WG2 Meeting #131 S2-1902511, Feb. 25-Mar. 1, 2019, pp. 1-7.

3GPP, "3rd Generation Partnership Project; Technical Specification Group Radio Access Network; Network; NG-RAN; NG Application Protocol (NGAP) (Release 15)", 3GPP TS 38.413 V15.2.0, Dec. 2018, pp. 1-308.

3GPP, "3rd Generation Partnership Project; Technical Specification Group Services and System Aspects; Procedures for the 5G System; Stage 2 (Release 16)", 3GPP TS 23.502 V16.0.0, Mar. 2019, pp. 1-420.

3GPP, "3rd Generation Partnership Project; Technical Specification Group Radio Access Network; Evolved Universal Terrestrial Radio Access Network (E-UTRAN); S1 Application Protocol (S1AP) (Release 15)", 3GPP TS 36.413 V15.4.0, Dec. 2018, pp. 1-383.

3GPP, "3rd Generation Partnership Project; Technical Specification Group Services and System Aspects; System Architecture for the 5G System; Stage 2 (Release 15)", 3GPP TS 23.501 V15.4.0, Dec. 2018, pp. 1-236.

3GPP, "3rd Generation Partnership Project; Technical Specification Group Radio Access Network; NR; User Equipment (UE) procedures in Idle mode and RRC Inactive state (Release 15)", 3GPP TS 38.304 V15.2.0, Dec. 2018, pp. 1-28.

3GPP, "3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304 V15.2.0, Dec. 2018, pp. 1-55.

\* cited by examiner

SESSION MANAGEMENT FUNCTION DERIVED CORE NETWORK ASSISTED RADIO ACCESS NETWORK PARAMETERS

CROSS-REFERENCE TO RELATED APPLICATIONS

This application claims priority to U.S. Patent Application Ser. No. 62/826,598 entitled "APPARATUSES, METHODS, AND SYSTEMS FOR SESSION RELATED CORE NETWORK ASSISTED RAN PARAMETERS" and filed on Mar. 29, 2019 for Genadi Velev, which is incorporated herein by reference in its entirety.

FIELD

The subject matter disclosed herein relates generally to wireless communications and more particularly relates to session management function derived core network assisted radio access network parameters.

BACKGROUND

The following abbreviations are herewith defined, at least some of which are referred to within the following description: Third Generation Partnership Project ("3GPP"), $5^{th}$ Generation ("5G"), 5G System ("5GS"), 5G Core Network ("5GC"), QoS for NR V2X Communication ("5QI/PQI"), Authentication, Authorization, and Accounting ("AAA"), Positive-Acknowledgment ("ACK"), Authentication and Key Agreement ("AKA"), Aggregation Level ("AL"), Access and Mobility Management Function ("AMY"), Angle of Arrival ("AoA"), Angle of Departure ("AoD"), Access Point ("AP"), Application Programming Interface ("API"), Access Stratum ("AS"), Authentication Server Function ("AUSF"), Authentication Token ("AUTN"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Cellular Internet of Things ("CIoT"), Closed-Loop ("CL"), Configuration Management ("CM"), Coordinated Multipoint ("CoMP"), Channel Occupancy Time ("COT"), Core Network ("CN"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Dedicated Control Channel ("DCCH"), Dedicated Traffic Channel ("DTCH"), Downlink Pilot Time Slot ("DwPTS"), Enhanced Clear Channel Assessment ("eCCA"), EPS Connection Management ("ECM"), Enhanced DRX ("eDRX"), Enhanced Mobile Broadband ("eMBB"), Enhanced MTC ("eMTC"), Evolved Node B ("eNB"), Extensible Authentication Protocol ("EAP"), Effective Isotropic Radiated Power ("EIRP"), Evolved Packet Core ("EPC"), Evolved Packet System ("EPS"), European Telecommunications Standards Institute ("ETSI"), Evolved Universal Terrestrial Radio Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Group Leader ("GL"), 5G Node B or Next Generation Node B ("gNB"), Global Navigation Satellite System ("GNSS"), General Packet Radio Service ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home SMF ("H-SMF"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Network ("LAN"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), LTE for Machines ("LTE-M"), Multiple Access ("MA"), Medium Access Control ("MAC"), Multimedia Broadcast Multicast Services ("MBMS"), Minimum Communication Range ("MCR"), Modulation Coding Scheme ("MCS"), Master Information Block ("MIB"), Mobile Initiated Connection Only ("MICO"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Protocol Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Positioning Reference Signal ("PRS"), Physical Sidelink Control Channel ("PSCCH"), Primary Secondary Cell ("PSCell"), Physical Sidelink Feedback Control Channel ("PSFCH"), Power Saving Mode ("PSM"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology/Type ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Registration Management ("RM"), RAN Notification Area ("RNA"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Sub scriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TM"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Universal Terrestrial Radio Access Network ("UTRAN"), Radio interface between a UE and a RAN ("Uu"), Vehicle-to-Vehicle ("V2V"), Vehicle-to-Anything ("V2X"), V2X UE (e.g., a UE capable of vehicular communication using 3GPP protocols), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, RAN parameters may be set.

BRIEF SUMMARY

Methods for session management function derived core network assisted radio access network parameters are disclosed. Apparatuses and systems also perform the functions of the methods. One embodiment of a method includes receiving session management function derived core network assisted radio access network parameters from a session management function. In certain embodiments, the method includes storing the session management function derived core network assisted radio access network parameters in a protocol data unit session level context. In some embodiments, the method includes using the session management function derived core network assisted radio access network parameters to determine an expected session activity behavior parameter set.

One apparatus for session management function derived core network assisted radio access network parameters includes a receiver that receives session management function derived core network assisted radio access network parameters from a session management function. In various embodiments, the apparatus includes a processor that: stores the session management function derived core network assisted radio access network parameters in a protocol data unit session level context; and uses the session management function derived core network assisted radio access network parameters to determine an expected session activity behavior parameter set.

Another embodiment of a method for session management function derived core network assisted radio access network parameters includes receiving from an access and mobility management function: an expected user equipment behavior parameters set; one or more expected session activity behavior parameter sets; or a combination thereof. In certain embodiments, the method includes storing the expected user equipment activity behavior parameter set, the one or more expected session activity behavior parameters sets, or the combination thereof.

Another apparatus for session management function derived core network assisted radio access network parameters includes a receiver that receives from an access and mobility management function: an expected user equipment behavior parameters set; one or more expected session activity behavior parameter sets; or a combination thereof. In some embodiments, the apparatus includes a processor that stores the expected user equipment activity behavior parameter set, the one or more expected session activity behavior parameters sets, or the combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
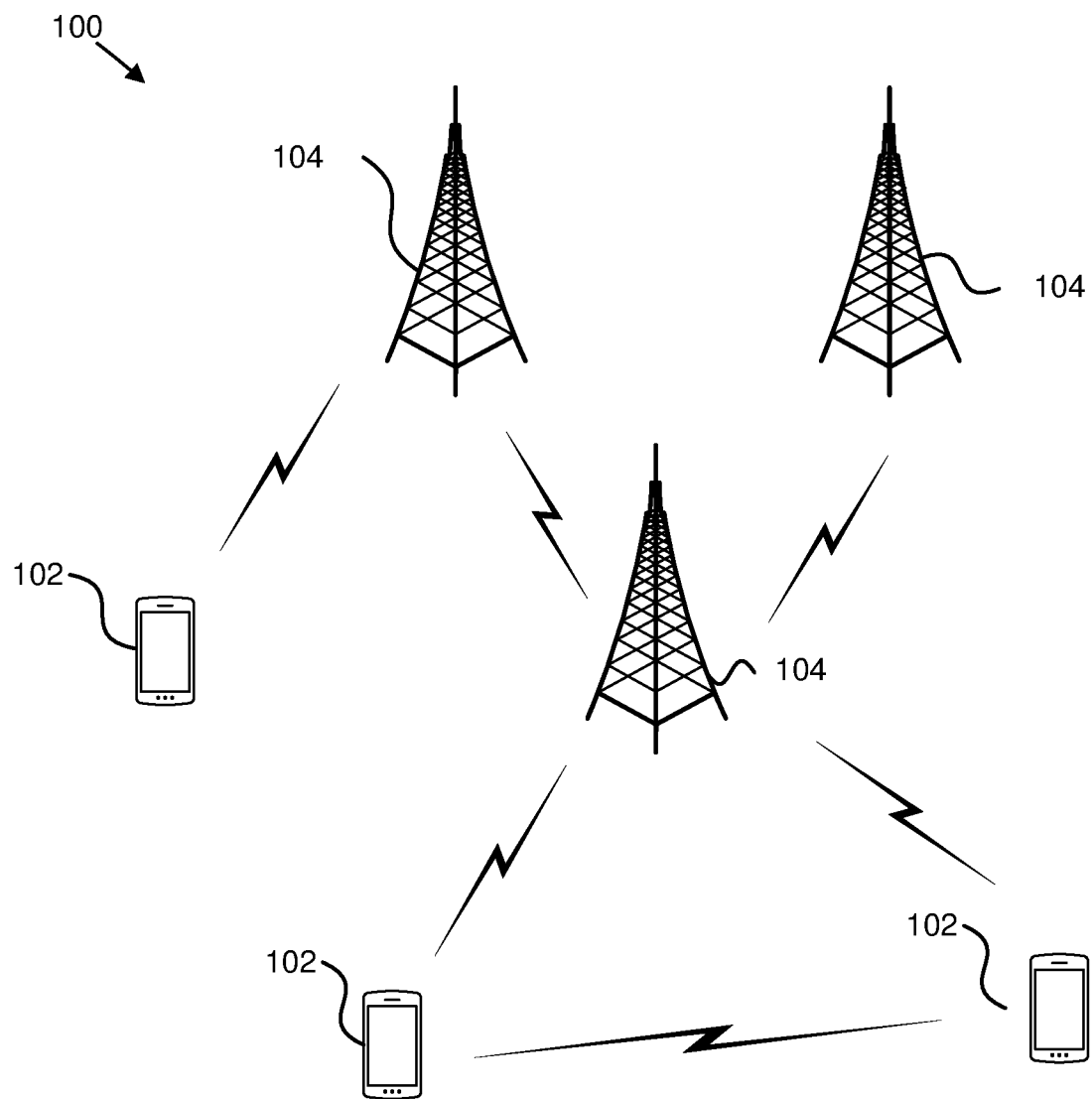
FIG. 1 is a schematic block diagram illustrating one embodiment of a wireless communication system for session management function derived core network assisted radio access network parameters.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for session management function derived core network assisted radio access network parameters. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive session management function derived core network assisted radio access network parameters from a session management function. In certain embodiments, the network unit 104 may store the session management function derived core network assisted radio access network parameters in a protocol data unit session level context. In some embodiments, the network unit 104 may use the session management function derived core network assisted radio access network parameters to determine an expected session activity behavior parameter set. Accordingly, the network unit 104 may be used for session management function derived core network assisted radio access network parameters.

In some embodiments, a network unit 104 may receive from an access and mobility management function: an expected user equipment behavior parameters set; one or more expected session activity behavior parameter sets; or a combination thereof. In certain embodiments, the network unit 104 may store the expected user equipment activity behavior parameter set, the one or more expected session activity behavior parameters sets, or the combination thereof. Accordingly, the network unit 104 may be used for session management function derived core network assisted radio access network parameters.

Figure 2:
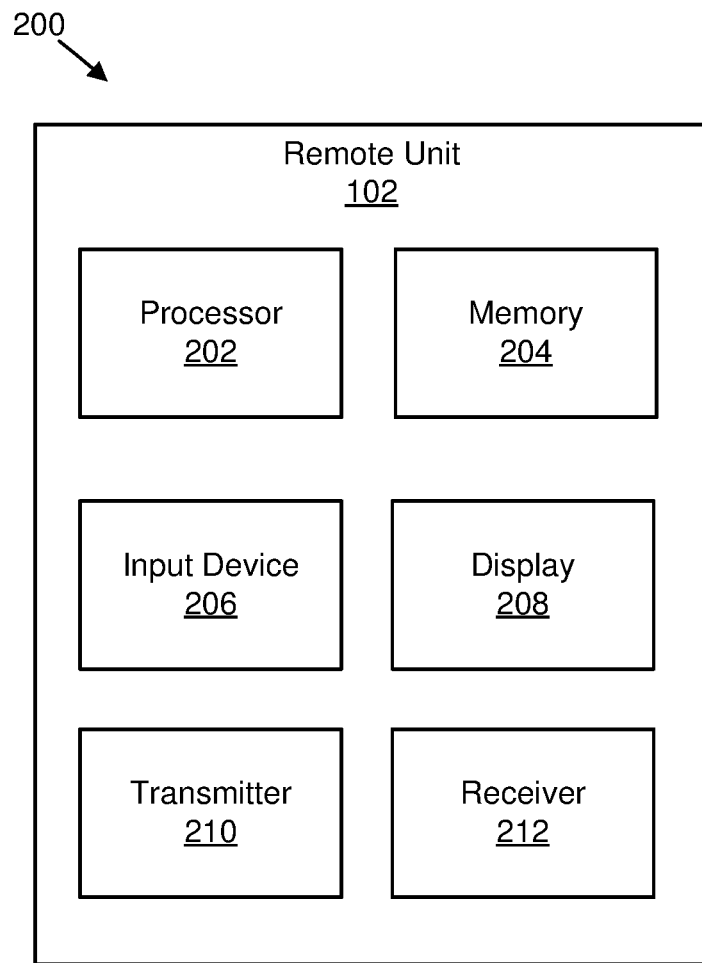
FIG. 2 is a schematic block diagram illustrating one embodiment of an apparatus that may be used for session management function derived core network assisted radio access network parameters.

FIG. 2 depicts one embodiment of an apparatus 200 that may be used for session management function derived core network assisted radio access network parameters. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
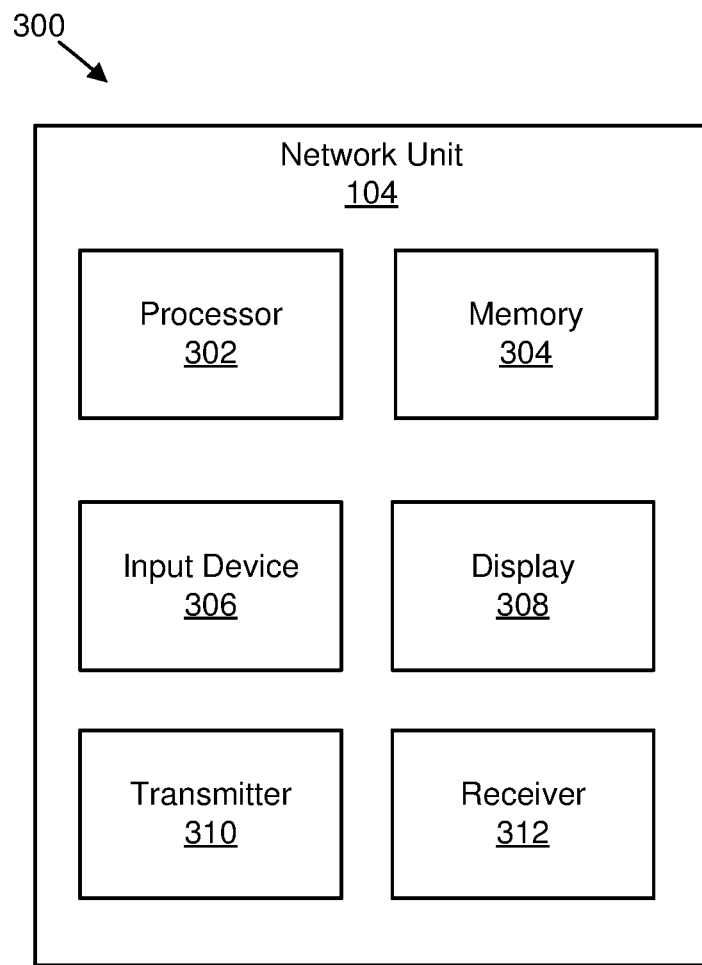
FIG. 3 is a schematic block diagram illustrating one embodiment of an apparatus that may be used for session management function derived core network assisted radio access network parameters.

FIG. 3 depicts one embodiment of an apparatus 300 that may be used for session management function derived core network assisted radio access network parameters. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 may receive session management function derived core network assisted radio access network parameters from a session management function. In some embodiments, the processor 302 may: store the session management function derived core network assisted radio access network parameters in a protocol data unit session level context; and use the session management function derived core network assisted radio access network parameters to determine an expected session activity behavior parameter set.

In certain embodiments, the receiver 312 receives from an access and mobility management function: an expected user equipment behavior parameters set; one or more expected session activity behavior parameter sets; or a combination thereof. In some embodiments, the processor 302 stores the expected user equipment activity behavior parameter set, the one or more expected session activity behavior parameters sets, or the combination thereof.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, a 5G system may include a radio access network (e.g., RAN, 5G-RAN, NG-RAN, etc.) and a 5GC may introduce selective activation and deactivation of a UP connection per PDU session. In certain embodiments, if a UE is in an idle state and performs a service request procedure, one or more PDU session may be activated (e.g., a UP connection for a PDU session) selectively.

In various embodiments, a 5GS offers may facilitate an application function (e.g., AF, an application server operated by a network operator or operated by a 3rd party) that may send to a 5GC a communication pattern or network configuration parameters associated with a particular UE. In such embodiments, those parameters may be used in the 5GS in one of the following ways: a) in the 5GC (e.g., in AMF or SMF) to configure settings of various features (e.g. related timers or other parameters) in a core network (for example, features that may use external parameters may be a MICO mode, an idle state eDRX, downlink packet buffering, etc.) and/or b) in a RAN to configure radio connection parameters (e.g. inactivity timer, whether to activate an RRC-Inactive state, RRC-Inactive state parameters, etc.).

In some embodiments, a 5GC (e.g., AMF) sends to a RAN CN assisted RAN parameter tuning. These CN assisted RAN parameters tuning are described herein. CN assisted RAN parameters tuning aids a RAN to minimize UE state transitions and achieve optimum network behavior.

CN assisted RAN parameters tuning may be derived by an AMF per UE in the AMF based on a collection of UE behavior statistics and/or other available information about expected UE behavior (e.g., such as subscribed DNN, SUPI ranges, or other information). If the AMF maintains expected UE behavior parameters, network configuration parameters, or SW derived CN assisted RAN parameters tuning, the AMF may use this information for selecting CN assisted RAN parameter values. If the AMF is able to derive a mobility pattern of a UE, the AMF may take the mobility pattern information into account when selecting CN assisted RAN parameter values.

An SW uses SW-associated parameters (e.g., expected UE behavior parameters or network configuration parameters of a UE) to derive SW derived CN assisted RAN parameters tuning. The SW sends the SW derived CN assisted RAN parameters tuning to the AMF during a PDU Session establishment procedure and if the SW-associated parameters change, the PDU Session modification procedure is applied. The AMF stores the SW derived CN assisted RAN parameters tuning in the PDU session level context.

Expected UE behavior parameters or network configuration parameters may be provisioned by an external party via an NEF to the AMF or SW.

CN assisted RAN parameters tuning provides a RAN with a way to understand UE behavior for the following aspects: a) "Expected UE activity behavior"—the expected pattern of a UE's changes between CM-CONNECTED and CM-IDLE states or a duration of the CM-CONNECTED state (this may be derived, for example, from statistical information, expected UE behavior, or from subscription information. The AMF derives the "Expected UE activity behavior" for the UE considering: 1) the expected UE behavior parameters or network configuration parameters received from a UDM; and/or 2) the SW derived CN assisted RAN parameters tuning associated with a PDU Session when the PDU Session is activated); b) "Expected HO behavior"—the expected interval between inter-RAN handovers (this may be derived by the AMF from mobility pattern information); c) "Expected UE mobility"—whether a UE is expected to be stationary or mobile (this may be derived from statistical information, expected UE behavior parameters, or from subscription information); d) "Expected UE moving trajectory" (this may be derived from statistical information, expected UE behavior parameters, or from subscription information); and/or e) "UE differentiation information" including expected UE behavior parameters excluding expected UE moving trajectory to support Uu operation optimization for NB-IoT UE differentiation if a RAT type is NB-IoT (the AMF decides a time at which to send this information to the RAN as "Expected UE activity behavior" carried in an N2 request over an N2 interface).

The calculation of CN assistance information (e.g., the algorithms used and related criteria), and a decision of a time at which it is considered suitable and stable to send to a RAN may be vendor specific.

In certain embodiments, parameters derived by an SMF (e.g., SMF derived CN assisted RAN parameters tuning) may occur. In various embodiments, an AMF may determine that UP connection and/or resources for a particular PDU session are activated and/or may determine whether to send SMF derived CN assisted RAN parameters tuning to a RAN node.

In some embodiments, a RAN node may use received CN assisted RAN parameters tuning. In various embodiments, such as in LTE and/or EPC (e.g., including NB-IoT), support of UP optimization for CIoT may be used by enabling suspension of RRC connections (e.g., suspend and/or resume procedure). In certain embodiments, such as in NR and/or 5GC, an RRC-INACTIVE state may be used to enable suspension of RRC connections. In some embodiments, CN assisted RAN parameters tuning (e.g., expected UE activity behavior) may be used in the RAN node to adjust and/or set radio parameters for 1) UP CIoT optimizations (e.g., suspend and/or resume) mechanism; and 2) an RRC-INACTIVE state mechanism.

In various embodiments, UP CIoT optimizations may be used in NB-IoT and LTE-M (or eMTC) access technologies and may enable suspension of an RRC connection (e.g., an AS context in UE and RAN node is kept), an MME's state may be ECM-IDLE with suspend indication, and an S1-U tunnel to a SGW may be released. In certain embodiments, UP CIoT optimizations may have an advantage to allow long deep sleep cycles (e.g., if PSM or MICO mode is used in conjunction with a suspend state) and there may be no periodic RAN updates needed. In some embodiments, UP CIoT optimizations may be more efficient for very infrequent data transmissions (e.g., 1-5 times per day).

In certain embodiments, an RRC-Inactive state may be used for 5G RAN access and it may be transparent to a core network. In various embodiments, an RRC-Inactive state uses periodic RNA updates and cannot be used with MICO mode is limited in its capability for power savings. In some embodiments, an RRC-Inactive state is efficient for data transmissions which are more frequent (e.g., every 30 seconds or 10 minutes).

In some embodiments, an NG-RAN connected to a 5GC supports two RRC mechanisms for power saving (e.g. UP CIoT optimizations and RRC-Inactive state mechanisms), and a RAN node may make a decision about which mechanism to apply for a particular UE. In various embodiments, a RAN node may determine whether to apply UP CIoT optimizations or use an RRC-Inactive state for a particular UE and/or a particular connection.

As may be appreciated, the term "RAN node" may be used to show an entity or entities hosting RAN-related functions. The RAN node may be a gNB, an eNB, an ng-eNB, an NB-IoT eNB, or any other BS that may be connected to a CN, such as the 5GC.

In certain embodiments, "SMF derived CN assisted RAN parameters tuning" may be information sent from an SMF to an AMF for a particular PDU session. In some embodiments, such as for roaming, an AMF and a RAN node may be in a VPLMN, and the AMF may get SW-derived information from an H-SMF in a HPLMN. In such embodiments, the AMF may use this information to derive and/or create "Expected UE behavior" (also called "Expected UE activity behavior) or "UE differentiation information" to be sent to a RAN node within CN assisted RAN parameters tuning. As used herein, the terms "Expected UE activity behavior" or "UE differentiation information" may be used with respect to NG-AP signaling and/or with respect to a RAN node. In various embodiments, all terms "Expected UE activity behavior" parameters, "Expected UE behavior" parameters, or "SMF derived CN assisted RAN parameters tuning" may have the same meaning, a similar meaning, the same format, and/or a similar format.

In some embodiments, an AMF maintains multiple sets of expected UE behavior parameters. These sets of parameters may be received from one or more SMFs upon establishment of a PDU session, but also may be received with the UE's access and mobility management context within subscription data. The UE's access and mobility management context within the subscription data may be sent from a UDM to the AMF and may contain one or more communication pattern parameters or one or more network configuration parameters.

In various embodiments, CN assisted RAN parameters tuning information may be categorized to UE mobility and/or access management related information and to session related information. The CN assisted RAN parameters tuning information may be expected UE activity behavior parameters or UE differentiation information. Session related information may refer to one or more sets of parameters of CN assisted RAN parameters tuning information (e.g., set of expected UE activity behavior parameters or set of UE differentiation information) stored in a UE's context in AMF.

In certain embodiments, an AMF sends to a RAN node only expected UE activity behavior or UE differentiation information that are associated with activated UP connections of PDU sessions. In such embodiments, the AMF may not know the current UP connection status (e.g., activated or deactivated) of established PDU sessions while the UE is in a CM-Connected state.

In some embodiments, an SW sends to a RAN node CN-assisted RAN parameters associated with a PDU session within N2 SM information. In such embodiments, the RAN node may be able to receive CN-assisted RAN parameters from multiple entities from a CN that may lead to interoperability issues.

In various embodiments: a) an AMF may maintain multiple sets of expected UE behavior parameters or UE differentiation information such as: 1) UE-level expected UE behavior parameters (e.g., as received from a UDM); and/or 2) PDU session-level expected UE behavior parameters received from an SW (e.g., based on SW derived CN assisted RAN parameters tuning); b) the AMF considers the UE-level expected UE behavior parameters set and one or more PDU session-level expected UE behavior parameters sets for which the PDU session's UP connection is activated if creating a container "Core network assisted RAN parameters tuning" to be included in the UE's context to be sent via NG-AP signaling message to the RAN node—the AMF merges the multiple sets of considered expected UE behavior parameters into a single set of expected UE behavior parameters; c) the AMF sends a single (e.g., merged) set of expected UE behavior parameters in NG-AP signaling to the RAN node; and/or d) the RAN node applies the set of expected UE behavior parameters received in the NG-AP signaling. In such embodiments, the AMF may not be aware of the UP connection status (e.g., activated or deactivated) of the established PDU sessions while the UE is in CM-Connected state.

In certain embodiments: a) an AMF may maintain one or more sets of parameters of CN assisted RAN parameters tuning information (e.g., set of expected UE activity behavior parameters or set of UE differentiation information)—the different sets of parameters may be described as follows: 1) UE-level parameters set (e.g., as received from a UDM without session management or PDU session relation)— these parameters sets are not associated with a PDU session ID (if control plane CIoT optimizations are used for a particular PDU Session and an SW sends SW derived CN assisted RAN parameters tuning to the AMF, then the AMF may merge those parameters with the parameter received from the UDM); 2) one or more PDU session-level parameters sets based on information (e.g., based on the SMF derived CN assisted RAN parameters tuning) received from the SMF—these parameters sets are associated with a corresponding PDU session ID; b) the AMF sends to a RAN node CN assisted RAN parameters tuning including all (e.g., one or more) available sets of session related parameters (e.g., sets of expected UE behavior parameters or sets of UE differentiation information)—if the sets of parameters are associated with a PDU session (e.g., derived from the SMF derived CN assisted RAN parameters tuning), then the AMF associates those sets with the corresponding PDU session ID and: 1) upon establishment of a new PDU session, the AMF may update and/or modify the UE's context in the RAN node by including an item ["Expected UE behavior", PDU session ID]; 2) upon release of a PDU session, the AMF may update and/or modify the UE's context in the RAN node by deleting an existing item ["Expected UE behavior", PDU session ID]; 3) if control plane CIoT optimization is used for a particular PDU session, then the AMF may include the "Expected UE behavior" without a PDU session ID (e.g., as UE-level expected UE behavior parameters); c) the RAN node stores all of received multiple sets of expected UE behavior parameters or sets of UE differentiation information)—some sets of expected UE behavior parameters may be associated with a PDU session ID; d) the RAN node modifies and/or updates its radio connection parameters by considering the availability of sets of expected UE activity behavior parameters or sets of UE differentiation information upon PDU session activation or deactivation—in other words, the RAN node updates its radio connection parameters by considering only those parameters sets (e.g., expected UE activity behavior parameters or UE differentiation information) for which the UP connection of the PDU session is activated—one or more of following cases may apply: 1) if a UP connection of PDU session X is activated (e.g., N3 and DRB activation), the RAN node considers the set of expected UE behavior parameters or set of UE differentiation information associated with PDU session X to determine a corresponding radio link configuration and the RAN node may perform an RRC modification procedure, change internal parameters, or change to an RRC-Inactive state; 2) if the UP connection of PDU session X is deactivated and the UE stays in an RRC-Connected state (e.g., because other PDU sessions are activated), the RAN node may reconfigure the radio link configuration by not considering the set of expected UE behavior parameters or set of UE differentiation information for PDU session X; and/or 3) if the set of expected UE behavior parameters or set of UE differentiation information is not associated with a PDU session ID, the RAN node may use the parameters set as UE-level parameters independent of PDU session activation or deactivation—for example, this may be applicable to data transmission using control plane CIoT optimizations (e.g., Data-over-NAS) in which SRBs are activated and used to transmit the data—the RAN node may consider the UE-level set of expected UE activity behavior or set of UE differentiation information for the signaling radio bearers only.

Figure 4:
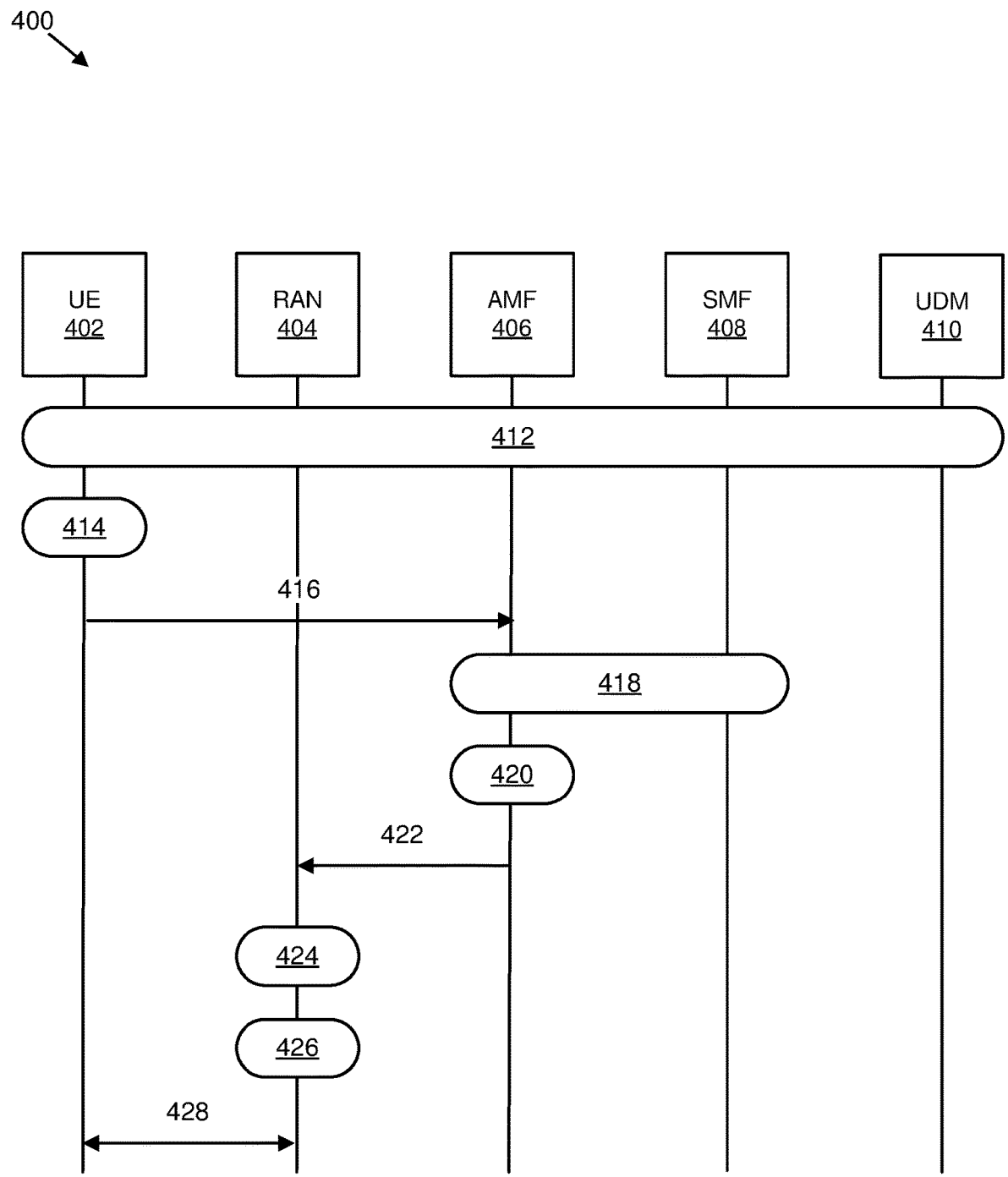
FIG. 4 is a schematic block diagram illustrating one embodiment of communications for sending UE context from a 5CN to a RAN during a service request procedure.

FIG. 4 is a schematic block diagram illustrating one embodiment of communications 400 for sending UE context from a 5CN to a RAN during a service request procedure.

FIG. 4 shows the transition of the UE from a CM-Idle state to a CM-Connected state. The communications 400 described herein may include one or more messages. The communications 400 include communications between a UE 402, a RAN 404, an AMF 406, an SMF 408, and a UDM 410.

In a first communication 412 between the UE 402, the RAN 404, the AMF 406, the SMF 408, and the UDM 410, the UE 402 performs a registration procedure which includes registering with a serving PLMN with the UE 402. In certain embodiments, the UE 402 is 414 in a CM-Idle state.

In a second communication 416 transmitted from the UE 402 to the AMF 406, the UE 402 initiates a service request message (e.g., a service request procedure) that may include transmitting a UE ID, PDU session IDs to be activated, and/or other parameters to the AMF 406.

In a third communication 418 transmitted between the AMF 406 and the SMF 408, 5GC signaling exchange is performed to activate UP connections of one or more PDU sessions as indicated in the service request message. Between the AMF 406 and SMF 408 the signaling exchange includes PDU session update session management context request and response messages.

The AMF 406 maintains 420 CN assisted RAN parameters per UE and per PDU Session. The CN assisted RAN parameters may be expected UE behavior parameters (e.g., expected UE/session activity behavior parameters or set of UE differentiation information). The AMF 406 determines whether to include one or more sets of expected UE/session activity behavior parameters or set of UE differentiation information.

If the AMF 406 stores UE-specific expected UE activity behavior, or if the PDU session to be activated uses control plane CIoT optimization transmission, the AMF 406 determines to include expected UE activity behavior parameters not associated with a PDU session ID. If the AMF 406 stores SMF derived CN assisted RAN parameters tuning associated with one or more PDU sessions, the AMF 406 determines to include expected session activity behavior parameters associated with a PDU session ID. If the AMF 406 stores UE-specific expected UE activity behavior and if one or more PDU sessions are associated with the SMF derived CN assisted RAN parameters tuning, the AMF 406 determines to include several sets of expected UE/session activity behavior parameters.

In a fourth communication 422 transmitted from the AMF 406 to the RAN 404, during NG-AP signaling from the AMF 406 to the RAN 404, the AMF 406 transmits an initial context setup request message and includes in the initial context setup request message security parameters, UE radio capability parameters, one or more sets of expected UE/session activity behavior parameters, and/or one or more PDU session IDs.

The RAN 404 stores 424 the received one or more sets of expected UE/session activity behavior parameters in the UE's context. The RAN 404 considers 426 the set of expected UE activity behavior parameters not associated with a PDU session ID and the one or more sets of expected session activity behavior parameters for the PDU sessions which are to be activated. The RAN 404 knows which PDU sessions are to be activated based on N2 SM Information messages received from the SMF 408. In a fifth communication 428 transmitted between the UE 402 and the RAN 404, an RRC connection modification procedure is performed.

FIG. 4 shows the initial UE context setup to the RAN 404. It is also possible to update the UE's context in the RAN 404 at any time. For example, during the establishment of a new PDU session, new external communication parameters may be available related to this PDU session and may be considered if the new PDU session is activated.

Figure 5:
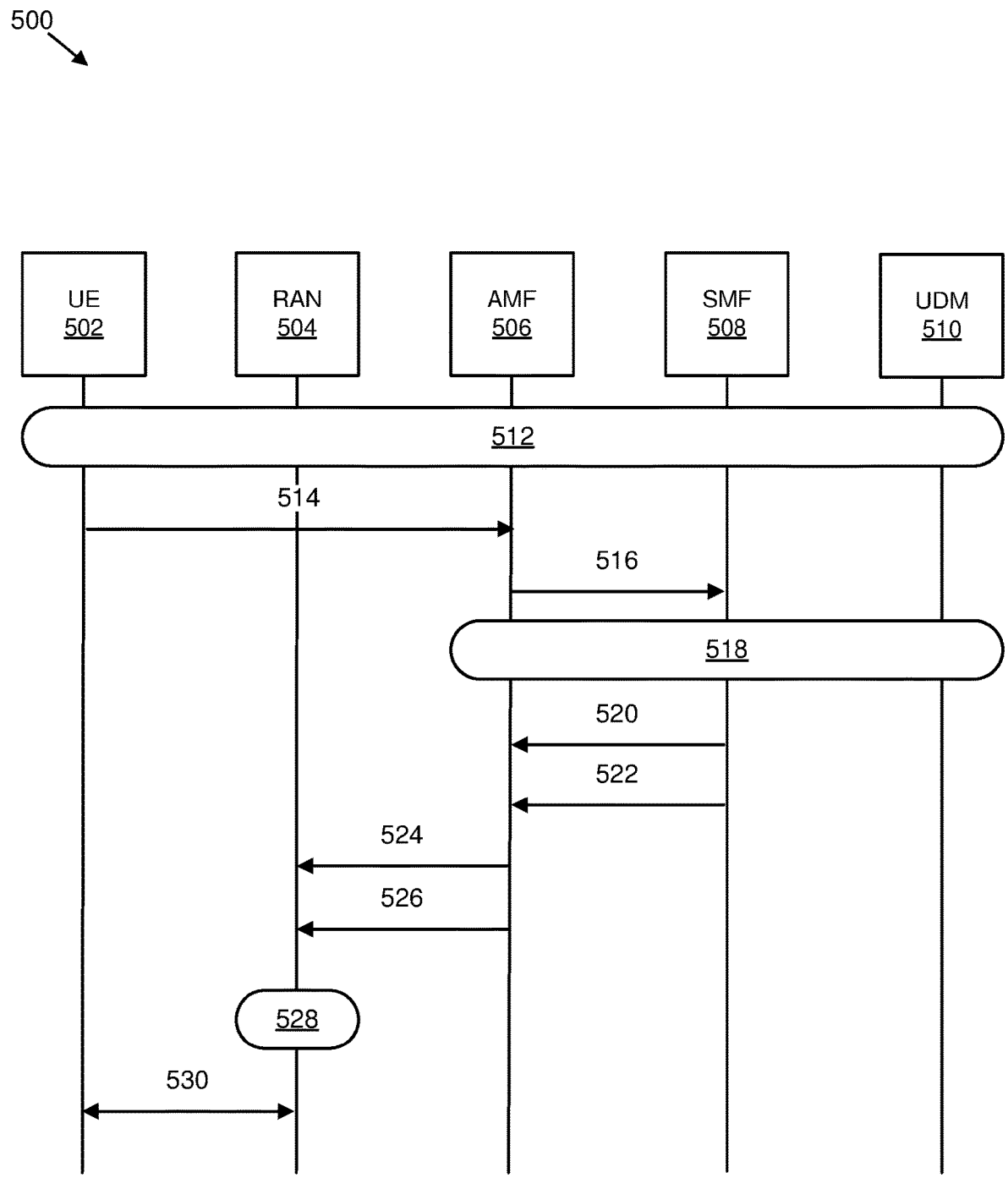
FIG. 5 is a schematic block diagram illustrating one embodiment of communications for establishing a new PDU session with SMF derived CN assisted RAN parameter tuning.

FIG. 5 is a schematic block diagram illustrating one embodiment of communications 500 for establishing a new PDU session with SMF derived CN assisted RAN parameter tuning. FIG. 5 shows the PDU Session establishment procedure and the update of expected UE activity behavior parameters (e.g., based on the SMF derived CN assisted RAN parameters tuning) but it may also be applied to a set of UE differentiation information. The communications 500 described herein may include one or more messages. The communications 500 include communications between a UE 502, a RAN 504, an AMF 506, an SMF 508, and a UDM 510.

In a first communication 512 between the UE 502, the RAN 504, the AMF 506, the SMF 508, and the UDM 510, the UE 502 performs an NAS registration procedure with a serving PLMN.

In a second communication 514 transmitted from the UE 502 to the AMF 506, the UE 502 initiates a PDU session establishment procedure by sending an NAS UL transport message that includes an S-NSSAI, a DNN, a PDU session ID, and/or a PDU session establishment request (e.g., PDU session ID).

In a third communication 516 transmitted from the AMF 506 to the SMF 508, the SMF 508 further facilitates initiating the PDU session establishment procedure which may include the PDU session create session management context request message that includes an S-NSSAI, a DNN, a PDU session ID, and/or a PDU session establishment request (e.g., PDU session ID).

In a fourth communication 518 transmitted between the AMF 506, the SMF 508, and the UDM 510, signaling exchange occurs within the 5GC for the PDU session establishment procedure (e.g., retrieval of session management related subscription data from the UDM 510, selection and configuration of UPF, etc.).

In a fifth communication 520 transmitted from the SMF 508 to the AMF 506, the SMF 508 sends to the AMF 506 N2 SM information and an N1 SM container. For example, the SMF 508 uses the following service operation: Namf Communication N1N2MessageTransfer (PDU Session ID, N2 SM information, N1 SM container (PDU Session Establishment Accept)).

In a sixth communication 522 transmitted from the SMF 508 to the AMF 506, if the SMF 508 has SMF derived CN assisted RAN parameters tuning parameters, the SMF 508 may perform the following service operation: Nsmf_PDUSession_SMContextStatusNotify (SMF derived CN assisted RAN parameters tuning). As may be appreciated, the fifth communication 520 and the sixth communication 522 may be part of the same communication and/or step.

In a seventh communication 524 transmitted from the AMF 506 to the RAN 504, the AMF 506 forwards to the RAN 504 the received information from the SMF 508 (e.g., the AMF 506 sends the N2 PDU session request (e.g., N2 SM information, NAS message (PDU Session ID, N1 SM container (PDU Session Establishment Accept))).

In an eighth communication 526, transmitted from the AMF 506 to the RAN 504, if the AMF 506 has received SMF derived CN assisted RAN parameters tuning from the SMF 508, the AMF 506 may additionally transmit an NG-AP message (e.g., UE context modification request that may contain one or more sets of expected UE/session activity behavior and/or PDU session IDs). As may be appreciated, the seventh communication 524 and the eighth communication 526 may be part of the same communication and/or step.

The RAN 504 updates 528 the UE's context with received sets of expected UE/session activity behavior parameters associated with the PDU session ID. The RAN 504 considers newly received expected UE/session activity behavior parameters set to determine whether to modify the settings of an RRC connection with the UE 502. For example, adjusting the RAN 504 parameter settings may mean one of the following: a) if PDU Session_1 and PDU Session_2 are active: the inactivity time (e.g., for RRC-Connected state) is 20 secs, afterwards the RAN 504 initiates an RRC-Inactive state; b) if only PDU Session_1 is active, the inactivity time is 5 secs and afterwards the RRC-Inactive state is activated; and c) if only PDU Session_2 is active, the inactivity time is 20 secs and afterwards a transition to an idle state is initiated.

In a ninth communication 530 transmitted between the UE 502 and the RAN 504, an RRC connection modification procedure is performed. Specifically, the RAN 504 initiates the RRC connection modification procedure with the UE 502 to establish new DRBs for the PDU session.

In some embodiments, if the UE 502 is in an RRC-Connected (or CM-Connected with RRC-Inactive, which is also referred to as RRC-Inactive) state and a PDU session is deactivated (but there are further activated PDU sessions), the RAN 504 may update its RRC settings by not considering corresponding expected UE activity behavior parameters for the deactivated PDU session.

In certain embodiments, if the UE 502 is in an RRC-Connected state (e.g., independent of which PDU session is activated), the RAN 504 may apply an inactivity time of 20 secs, afterwards the RAN 504 may initiate an RRC-Inactive state.

In various embodiments, in adjusting the RAN 504 parameter settings: a) if PDU Session_1 and PDU Session_2 are active: the inactivity time (for RRC Connected state) is 20 secs, afterwards the RAN 504 initiates an RRC-Inactive state; b) if only PDU Session_1 is active, the inactivity time is 5 secs and afterwards the RRC-Inactive state is activated; and c) if only PDU Session_2 is active, the inactivity time is 20 secs and afterwards a transition to an idle state is initiated.

In some embodiments, expected UE activity behavior parameters sent from an AMF to a RAN may be enhanced. In certain embodiments, expected UE activity behavior parameters include an expected activity period, an expected idle period, and/or source of UE activity behavior information parameters. The expected activity period and expected idle period parameters may be used in the RAN to determine whether to transition the UE from a connected state: i) to an idle state; or ii) to an RRC-Inactive state.

In one embodiment, in response to a request to resume an RRC connection, a network may reject the request to resume the RRC connection and may send the UE to one of the following: a) to an RRC INACTIVE (with a wait timer or with a direct resuspension of the RRC connection); or b) a directly release of the RRC connection and send the UE to an RRC IDLE state (and optionally may instruct the UE to initiate NAS level recovery in which the network sends an RRC setup message).

In another embodiment, a transition to an idle state may happen due to a CN (e.g., SMF) initiated deactivation of a UP connection (e.g., DRB+N3 tunnel) for a PDU session. If all DRBs are to be released at a network side, then a RAN may have no reason to keep a UE in an RRC-Inactive state and may send the UE to the idle state. However, the UE may have an always-on PDU session (this may mean that the UP connection for the PDU session is always activated if the UE transitions to a connected state). In some embodiments, a CN may not initiate selective UP resources deactivation. This may mean that a UE in an RRC-Inactive state may have at least one DRB established and/or active if always-on PDU session is established for the UE, and the UE may stay in an RRC-Inactive state until a failure happens (e.g., out-of-coverage, or other failure). If there is a non-failure condition, the UE may stay in the RRC-Inactive state. In various embodiments, a UE may move to an idle state (e.g., to releases a UE's context in a RAN, to move the UE to a MICO mode, and/or to save signaling for a high-mobility UE).

In certain embodiments, a CN may provide RRC inactive assistance information to a RAN that may be considered UE-related information in contrary to the session (or PDU Session) related information. The RRC inactive assistance information may include: a) UE specific DRX values; b) a registration area provided to the UE; c) a periodic registration update timer; d) if an AMF has enabled a MICO mode for the UE, an indication that the UE is in the MICO mode; and/or information from a UE identifier that enables the RAN to calculate a UE's RAN paging occasions.

In some embodiments, to enable a RAN to send a UE to an idle state (even though DRBs are still available), a mechanism may be used to monitor the UE's inactivity or to receive assistance information from a CN. In such embodiments, there may be a parameter in expected UE activity behavior parameters (or any other CN assisted RAN parameters tuning or in RRC inactive assistance information) that shows a time for which a communication may last. In one example, the parameter may be called communication duration and may mean a duration time (or validity time) for applicability of a communication pattern of expected activity period and expected idle period from the expected UE activity behavior parameters. In another example, the parameter may be used similarly to RRC inactive assistance information; however, it is not part of the RRC inactive assistance information, but part of the expected UE activity behavior parameters. The parameter may be expressed in a unit (e.g., minutes) in the NG-AP signaling. In certain embodiments, a parameter communication duration time in communication pattern parameters may be stored in a UDM and/or UDR and provided to an SMF (or AMF) during a PDU session establishment procedure or during a registration procedure. The SMF (or AMF) may use the parameter to derive a communication duration parameter within expected UE activity behavior parameters (e.g., as part of NG-AP signaling).

In various embodiments, a timer at a RAN may be used. While a UE is in an RRC-Inactive state, the timer may be used to monitor UE data inactivity on DRBs and SRBs and to trigger a transition from an RRC-Inactive state to an idle state. For example, the timer may be called RRC-inactive inactivity timer. The timer may apply if the UE is in an RRC-Inactive state. In certain embodiments, the timer is started if any MAC SDU for a DTCH logical channel, a DCCH logical channel, or a CCCH logical channel is received, or if any MAC SDU for a DTCH logical channel, or a DCCH logical channel is transmitted. In some embodiments, if a UE has not transmitted or received any data (e.g., application data over DRBs or NAS data over SRBs) for an RRC-Inactive inactivity time (e.g., for 30 min), then a RAN may decide to send the UE to an idle state. The RRC-Inactive inactivity timer may be started upon the expiration of a communication duration time (e.g., from expected UE activity behavior parameters). The RRC-Inactive inactivity timer may be configured in a RAN (e.g., using an OAM system) or may be signaled from a CN as a statistical parameter (e.g., within CN assisted RAN parameters tuning).

In certain embodiments, a RAN may perform one of the following procedures if an RRC-Inactive inactivity timer expires or a communication duration time is over: a) the RAN initiates RAN paging to resume an RRC connection—afterwards the RAN releases the RRC connection (e.g., sends a UE to an idle state by sending NG-AP signaling to release the UE's context in the RAN and RRC release command to the UE); b) the RAN sends RAN paging to the UE including a paging cause indicating release of RRC connection, release of AS context, transition to idle, or something similar —if the UE receives the RAN paging with such an indication, the UE may not initiate a resume procedure, but instead the UE may release the AS context and transition to the RRC-Idle state and indicate to the NAS layer the transition to the RRC-Idle state (this may have the benefit of saving signaling over a Uu interface (e.g., for a resume procedure and an explicit RRC release procedure) and transmission power at the UE side, but the RAN may not know whether the UE has received the RAN paging); c) the RRC-Inactive inactivity timer value may be a multiple of a periodic RNA update timer (e.g., the RRC-Inactive inactivity timer=[2× periodic RNA update timer]—if the UE has been data inactive for twice the periodic RNA update timer value and if the UE performs a second periodic RNA update procedure (sending RRCResumeRequest or RRCResumeRequest1 message with cause code RNA update), the RAN may decide to reply to the UE with a message for releasing the RRC connection (e.g., RRCRelease or RRCReject message) including an appropriate release or reject code indicating to the UE that transition to an idle state is required—upon reception of an RRCRelease message or an RRCReject message with a corresponding cause, the UE may delete the AS context, transfer to the RRC-Idle state, and indicate to an NAS layer about the transition); d) the RAN node may initiate the release of the UE's context with the core network (e.g., 5GC) without explicit signaling with the UE an implicit RRC release; and/or e) the RRC-Inactive inactivity timer is started (or restarted) if the UE enters the RRC inactive state and if the UE transmits the periodic RNA update successfully. At a time in which the RRC-Inactive inactivity timer expires (e.g., the UE had not been able to transmit the RNA update successfully), the UE initiates transition to the RRC idle state.

Figure 6:
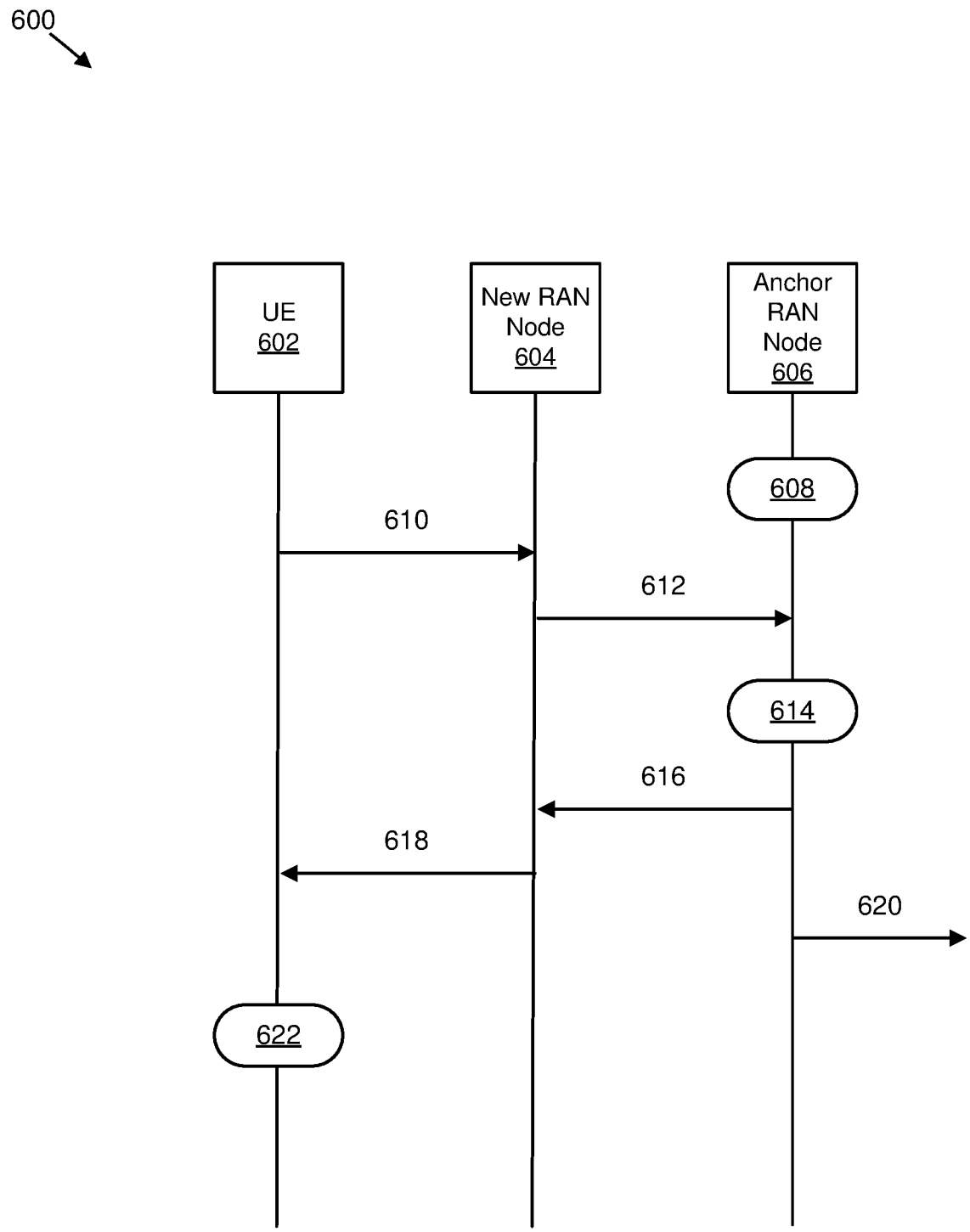
FIG. 6 is a schematic block diagram illustrating one embodiment of communications for transition from an RRC-Inactive state to an Idle state.

FIG. 6 is a schematic block diagram illustrating one embodiment of communications 600 for transition from an RRC-Inactive state to an idle state. FIG. 6 shows an RRC release procedure performed during a periodic RNA update procedure. The communications 600 described herein may include one or more messages. The communications 600 include communications between a UE 602, a new RAN node 604, and an anchor RAN node 606.

In various embodiments, an RRC-Inactive state is activated for the UE 602 and the Anchor RAN node 606 stores 608 the UE 602 context.

In a first communication 610 transmitted from the UE 602 to the new RAN node 604, the UE 602 initiates a resume procedure (e.g., by sending a resume request message that includes a cause due to RNA update to the new RAN node 604) due to a periodic RNA update.

In a second communication 612 transmitted from the new RAN node 604 to the anchor RAN node 606, the new RAN node 604 sends the resume request message to the anchor RAN node 606.

The anchor RAN node 606 is able to determine 614 that the UE 602 has been inactive for some preconfigured time (e.g., due to an RRC-Inactive inactivity time or a communication duration time being over). For example, the anchor RAN node 606 may have implemented the RRC-Inactive inactivity timer and may use one of expected UE activity behavior parameters (e.g., communication duration time) or other CN assisted RAN information to determine an appropriate duration of UE inactivity in an RRC-Inactive state before transition to an idle state. In one particular example, the RRC-Inactive inactivity timer may be configured with multiple (e.g., N times) of periodic RNA update times.

In a third communication 616 transmitted from the anchor RAN node 606 to the new RAN node 604, the anchor RAN node 606 sends an RRC connection release command message (e.g., RRCRelease message or RRCReject message with an appropriate cause value) the new RAN node 604. In a fourth communication 618 transmitted from the new RAN node 604 to the UE 602, the new RAN node 604 sends the RRC connection release command message (e.g., RRCRelease message or RRCReject message with an appropriate cause value) to the UE 602. In a fifth communication 620 transmitted from the anchor RAN node 606, the anchor RAN node 606 initiates an NG-AP UE context Release Request towards a CN (e.g., an AMF).

The UE 602 deletes 622 the AS context and transitions to an CM-Idle state. The new RAN node 604 and/or the anchor RAN node 606 deletes the UE's context.

In various embodiments, the UE 602 may be configured with a data inactivity monitoring functionality (e.g., RRC-Inactive inactivity timer) if the UE 602 is in an RRC INACTIVE state either: 1) during an RRC procedure for activation of the RRC-Inactive state; or 2) during RRC connection configuration signaling. In such embodiments, the UE 602 may store the timer in its RRC-Inactive configuration settings (e.g., in a MAC layer). In some embodiments, the UE 602 may start (or restart) a timer if transferring from an RRC-Connected state to an RRC-Inactive state after an RRC-Inactive update procedure (e.g., periodic or mobility update) or after any kind of data transmission and/or reception. In such embodiments, after the timer expires, the MAC layer indicates to the RRC layer about a need to transfer to an idle state (e.g., MAC layer indicates failure or similar cause value). In certain embodiments, a UE transfer to an idle state (e.g., deletes an AS context) without explicit signaling with a network.

In some embodiments, if a RAN node and a UE implements both mechanisms including UP CIoT optimizations and transition to an RRC-Inactive state, the RAN node may determine which mechanism to apply. In such embodiments, the RAN node takes CN assisted RAN parameters tuning into account, particularly the UE-level parameters and PDU session-level parameters for a currently activated PDU session. In particular, the PDU session-level parameters for the activated PDU sessions (e.g., a set of expected UE activity behavior parameters or the sets of UE differentiation information) may be used to determine which mechanism to use. For example, if an expected idle period from expected UE activity behavior parameters indicates a value bigger than a particular threshold (e.g., 60 minutes), the RAN node may decide to use the UP CIoT optimizations.

In various embodiments: a) a RAN node first uses an RRC-Inactive state (e.g., after a UE has been inactive for some time in an RRC-Connected state); b) if the UE in the RRC-Inactive state has been data inactive for a particular time (e.g., 2 times a periodic RNA update time) or some other events occur, the RAN node may decide to apply a UP CIoT optimization mechanism; c) while UP CIoT optimizations apply, if the UE's data activity increases or some other events occur, the RAN node may decide to apply the RRC-Inactive state; and/or d) while UP CIoT optimizations apply, if the UE's data activity decreases or some other events occur (e.g., based on a communication duration time parameter), the RAN node may decide to apply an RRC-Idle state. In other words, in some embodiments, a transition between an RRC-Inactive state and UP CIoT optimizations in both directions may be enabled based on activation and/or deactivation of a PDU session with particular PDU session-related CN assisted RAN parameters tuning information (e.g., expected UE activity behavior parameters or UE differentiation information).

In certain embodiments, an expected UE behavior may have an IE that indicates a behavior of a UE with predictable activity and/or mobility behavior to assist a NG-RAN node in determining an optimum RRC connection time and to help with an RRC INACTIVE state transition and RNA configuration (e.g., size and shape of the RNA). In various embodiments, configurations may be made as shown in Table 1, Table 2, Table 3, and or Table 4.

TABLE 1

| IE/Group Name | Presence | Range | IE type and reference | Semantics description |
| --- | --- | --- | --- | --- |
| Expected UE Activity Behavior | | 0 ... <maxnoofPDUSessions> | | Indicates the UE expected activity behavior. |
| >Expected UE Activity Behavior Item | O | | 9.3.1.94 | Each item may be associated with a PDU Session ID. If there is no associated PDU Session ID, then the Expected UE Activity Behavior is applicable to the UE. |
| Expected HO Interval | O | | ENUMERATED (sec15, sec30, sec60, sec90, sec120, sec180, long-time, . . .) | Indicates the expected time interval between inter NG-RAN node handovers. If "long-time" is included, the interval between inter NG-RAN node handovers is expected to be longer than 180 seconds. |
| Expected UE Mobility | O | | ENUMERATED (stationary, mobile, . . .) | Indicates whether the UE is expected to be stationary or mobile. |

TABLE 1-continued

| IE/Group Name | Presence | Range | IE type and reference | Semantics description |
|---|---|---|---|---|
| Expected UE Moving Trajectory | | 0 . . . 1 | | Indicates the UE's expected geographical movement. |
| >Expected UE Moving Trajectory Item | | 1 . . . <maxnoofCellsUEMovingTrajectory> | | Includes list of visited and non-visited cells, where visited cells are listed in the order the UE visited them with the most recent cell being the first in the list. Non-visited cells are included immediately after the visited cell they are associated with. |
| >>NG-RAN CGI | M | | 9.3.1.73 | |
| >>Time Stayed in Cell | O | | INTEGER (0 . . . 4095) | Included for visited cells and indicates the time a UE stayed in a cell in seconds. If the UE stays in a cell more than 4095 seconds, this IE is set to 4095. |

TABLE 2

| Range bound | Explanation |
|---|---|
| maxnoofPDUSessions | Maximum no. of established PDU Session. Value is (e.g.) 28. |

As may be appreciated, the number of 28 PDU sessions in Table 2 may be based on an assumption of a maximum of 28 data radio bearers (e.g., a maximum number of radio bearers of 32 and considering 4 signaling radio bearers).

TABLE 3

| Range bound | Explanation |
|---|---|
| maxnoofCellsUEMovingTrajectory | Maximum no. of cells of UE moving trajectory. Value is 16. |

In some embodiments, an expected UE activity behavior may have an IE that indicates information about an expected UE activity behavior. In such embodiments, the following may apply: a) if an expected UE activity behavior item is associated with a PDU session ID, a RAN node may consider the expected UE activity behavior parameters upon activation or deactivation of a UP connection for a PDU session to modify the radio connection settings—if the PDU session ID is associated with the expected UE activity behavior item; and/or b) if the expected UE activity behavior item is not associated with the PDU session ID, the RAN node may consider the expected UE activity behavior parameters as UE related parameters and may apply these parameters also in cases if only SRBs are established (e.g., for data transmission using control plane CIoT optimizations).

TABLE 4

| IE/Group Name | Presence | Range | IE type and reference | Semantics description |
|---|---|---|---|---|
| Expected Activity Period | O | | INTEGER (1 . . . 30\|40\|50\|60\|80\|100\|120\|150\|180\|181, . . .) | If set to "181" the expected activity time is longer than 180 seconds. The remaining values indicate the expected activity time in [seconds]. |
| Expected Idle Period | O | | INTEGER (1 . . . 30\|40\|50\|60\|80\|100\|120\|150\|180\|181, . . .) | If set to "181" the expected idle time is longer than 180 seconds. The remaining values indicate the expected idle time in [seconds]. |
| Communication duration | O | | INTEGER (1 . . . 30\|40\|50\|60\|80\|100\|120\|150\|180\|181, . . .) | Time interval during which the pattern of "Expected Activity Period" and "Expected Idle Period" applies in [minutes]. |
| Source of UE Activity Behavior Information | O | | ENUMERATED (subscription information, statistics, . . .) | If "subscription information" is indicated, the information contained in the Expected Activity Period IE and the Expected Idle Period IE, if |

TABLE 4-continued

| IE/Group Name | Presence | Range | IE type and reference | Semantics description |
| --- | --- | --- | --- | --- |
| | | | | present, is derived from subscription information. If "statistics" is indicated, the information contained in the Expected Activity Period IE and the Expected Idle Period IE, if present, is derived from statistical information. |

Figure 7:
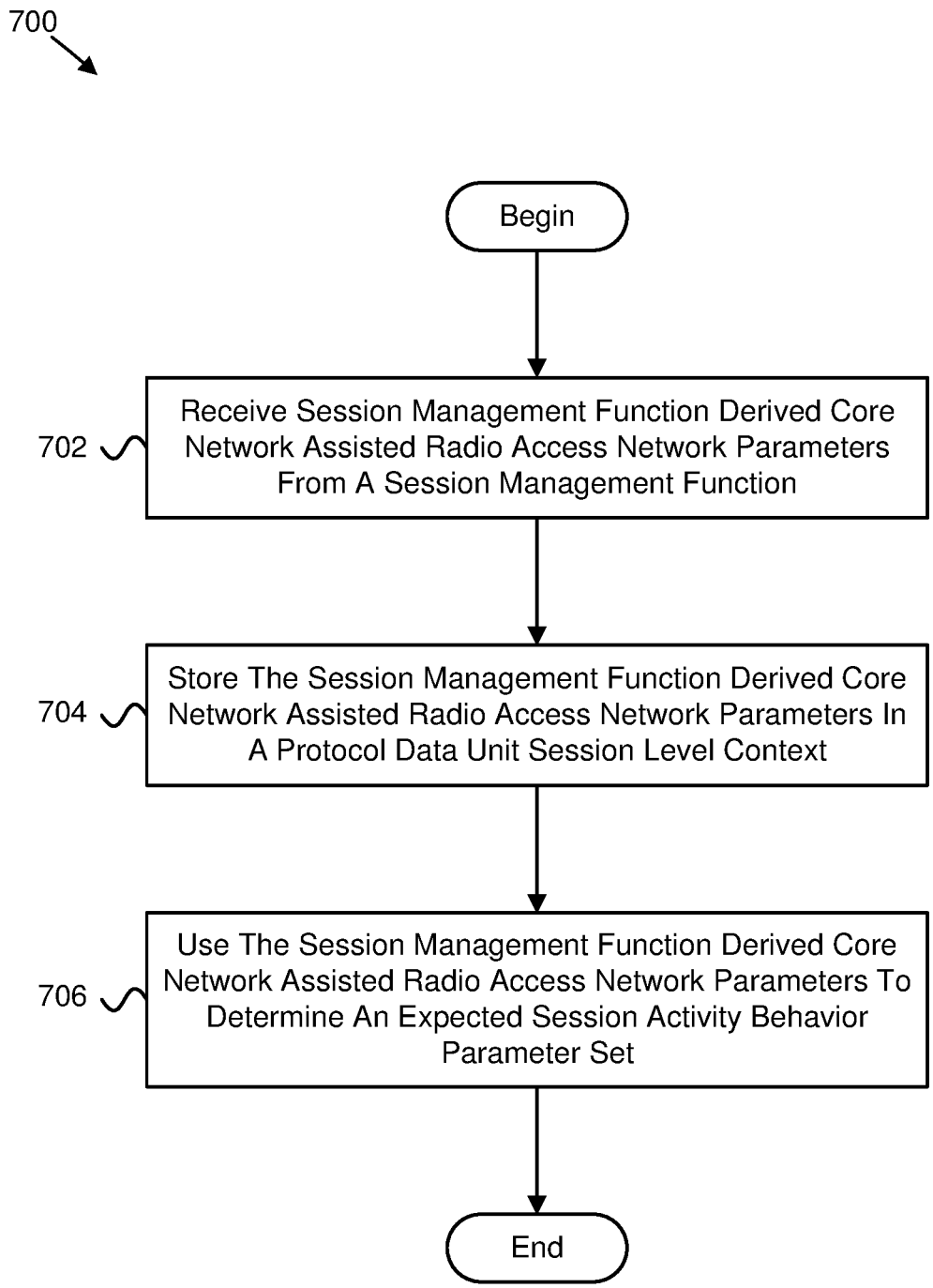
FIG. 7 is a flow chart diagram illustrating one embodiment of a method for session management function derived core network assisted radio access network parameters.

FIG. 7 is a flow chart diagram illustrating one embodiment of a method 700 for session management function derived core network assisted radio access network parameters. In some embodiments, the method 700 is performed by an apparatus, such as the network unit 104 (e.g., AMF). In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702 session management function derived core network assisted radio access network parameters from a session management function. In certain embodiments, the method 700 includes storing 704 the session management function derived core network assisted radio access network parameters in a protocol data unit session level context. In some embodiments, the method 700 includes using 706 the session management function derived core network assisted radio access network parameters to determine an expected session activity behavior parameter set.

In certain embodiments, the session management function derived core network assisted radio access network parameters are received during a protocol data unit session establishment procedure. In some embodiments, the expected session activity behavior parameter set is associated with a protocol data unit session identifier. In various embodiments, the method 700 further comprises determining a user equipment level of expected user equipment behavior parameters set considering at least: expected user equipment behavior parameters or network configuration parameters received from a unified data management; and session management function derived core network assisted radio access network parameters associated with a protocol data unit session using control plane delivery optimization.

In one embodiment, the method 700 further comprises transmitting to a radio access network: the user equipment level of expected user equipment behavior parameters set; one or more expected session activity behavior parameter sets; or a combination thereof. In certain embodiments, the expected session activity behavior parameter set is a protocol data unit session level expected user equipment activity behavior parameter set.

Figure 8:
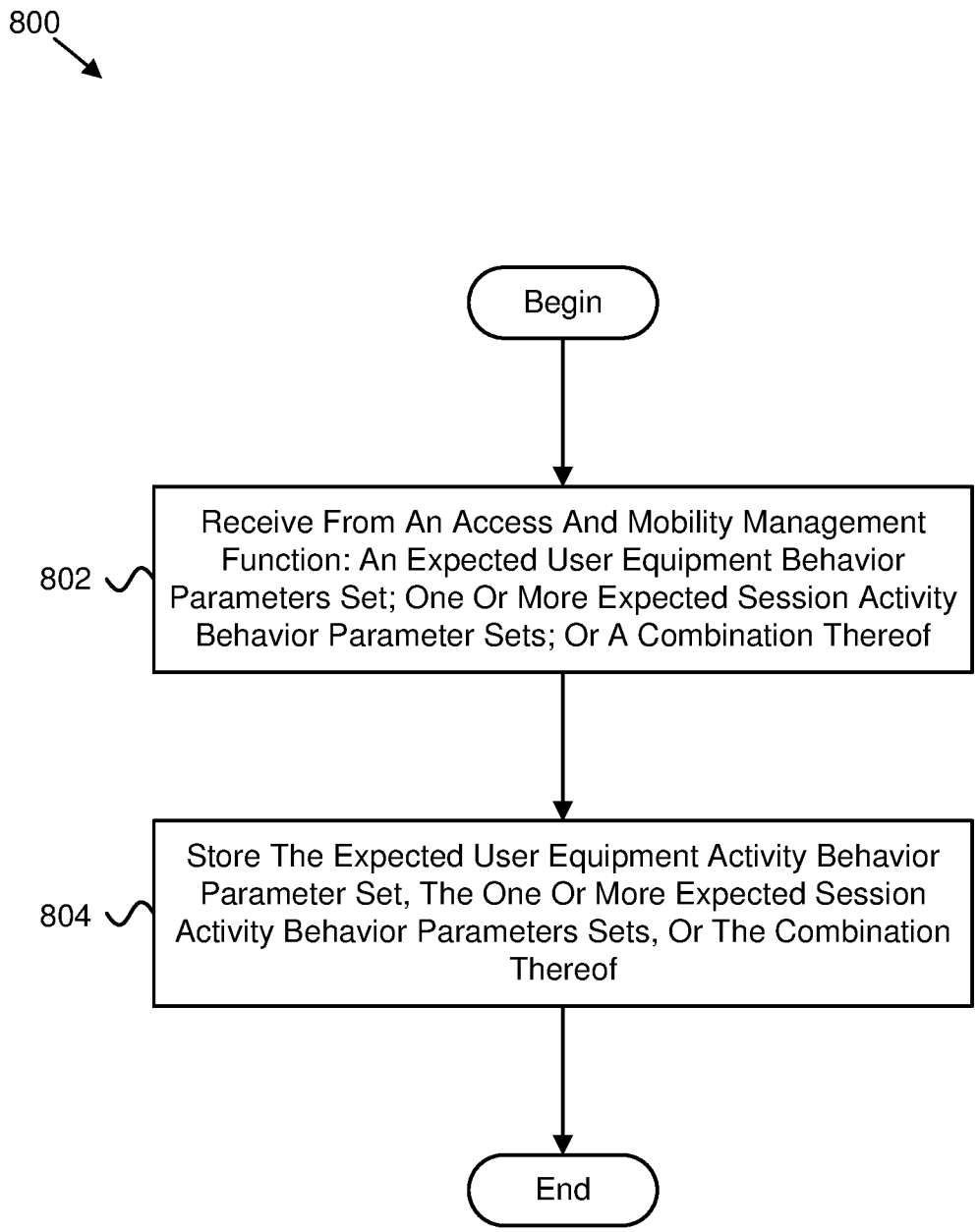
FIG. 8 is a flow chart diagram illustrating another embodiment of a method for session management function derived core network assisted radio access network parameters.

FIG. 8 is a flow chart diagram illustrating another embodiment of a method 800 for session management function derived core network assisted radio access network parameters. In some embodiments, the method 800 is performed by an apparatus, such as the network unit 104 (e.g., RAN). In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802 from an access and mobility management function: an expected user equipment behavior parameters set; one or more expected session activity behavior parameter sets; or a combination thereof. In certain embodiments, the method 800 includes storing 804 the expected user equipment activity behavior parameter set, the one or more expected session activity behavior parameters sets, or the combination thereof.

In certain embodiments, the method 800 further comprises updating radio connection parameters of a radio access network based on the expected user equipment activity behavior parameter set, the one or more expected session activity behavior parameters sets, or the combination thereof. In some embodiments, each expected session activity behavior parameter set of the one or more expected session activity behavior parameter sets is associated with a protocol data unit session identifier.

In various embodiments: the one or more expected session activity behavior parameter sets are one or more protocol data unit session level expected user equipment activity behavior parameter sets; and the expected user equipment behavior parameters set is a user equipment level expected user equipment behavior parameters set. In one embodiment, a radio access network considers the one or more protocol data unit session level expected user equipment activity behavior parameter sets in response to user plane resources for a corresponding protocol data unit session being activated.

In one embodiment, a method comprises: receiving session management function derived core network assisted radio access network parameters from a session management function; storing the session management function derived core network assisted radio access network parameters in a protocol data unit session level context; and using the session management function derived core network assisted radio access network parameters to determine an expected session activity behavior parameter set.

In certain embodiments, the session management function derived core network assisted radio access network parameters are received during a protocol data unit session establishment procedure.

In some embodiments, the expected session activity behavior parameter set is associated with a protocol data unit session identifier.

In various embodiments, the method further comprises determining a user equipment level of expected user equipment behavior parameters set considering at least: expected user equipment behavior parameters or network configuration parameters received from a unified data management; and session management function derived core network assisted radio access network parameters associated with a protocol data unit session using control plane delivery optimization.

In one embodiment, the method further comprises transmitting to a radio access network: the user equipment level of expected user equipment behavior parameters set; one or more expected session activity behavior parameter sets; or a combination thereof.

In certain embodiments, the expected session activity behavior parameter set is a protocol data unit session level expected user equipment activity behavior parameter set.

In one embodiment, an apparatus comprises: a receiver that receives session management function derived core network assisted radio access network parameters from a session management function; and a processor that: stores the session management function derived core network assisted radio access network parameters in a protocol data unit session level context; and uses the session management function derived core network assisted radio access network parameters to determine an expected session activity behavior parameter set.

In certain embodiments, the session management function derived core network assisted radio access network parameters are received during a protocol data unit session establishment procedure.

In some embodiments, the expected session activity behavior parameter set is associated with a protocol data unit session identifier.

In various embodiments, the processor determines a user equipment level of expected user equipment behavior parameters set considering at least: expected user equipment behavior parameters or network configuration parameters received from a unified data management; and session management function derived core network assisted radio access network parameters associated with a protocol data unit session using control plane delivery optimization.

In one embodiment, the apparatus further comprises a transmitter that transmits to a radio access network: the user equipment level of expected user equipment behavior parameters set; one or more expected session activity behavior parameter sets; or a combination thereof.

In certain embodiments, the expected session activity behavior parameter set is a protocol data unit session level expected user equipment activity behavior parameter set.

In one embodiment, a method comprises: receiving from an access and mobility management function: an expected user equipment behavior parameters set; one or more expected session activity behavior parameter sets; or a combination thereof; and storing the expected user equipment activity behavior parameter set, the one or more expected session activity behavior parameters sets, or the combination thereof.

In certain embodiments, the method further comprises updating radio connection parameters of a radio access network based on the expected user equipment activity behavior parameter set, the one or more expected session activity behavior parameters sets, or the combination thereof.

In some embodiments, each expected session activity behavior parameter set of the one or more expected session activity behavior parameter sets is associated with a protocol data unit session identifier.

In various embodiments: the one or more expected session activity behavior parameter sets are one or more protocol data unit session level expected user equipment activity behavior parameter sets; and the expected user equipment behavior parameters set is a user equipment level expected user equipment behavior parameters set.

In one embodiment, a radio access network considers the one or more protocol data unit session level expected user equipment activity behavior parameter sets in response to user plane resources for a corresponding protocol data unit session being activated.

In one embodiment, an apparatus comprises: a receiver that receives from an access and mobility management function: an expected user equipment behavior parameters set; one or more expected session activity behavior parameter sets; or a combination thereof; and a processor that stores the expected user equipment activity behavior parameter set, the one or more expected session activity behavior parameters sets, or the combination thereof.

In certain embodiments, the processor updates radio connection parameters of a radio access network based on the expected user equipment activity behavior parameter set, the one or more expected session activity behavior parameters sets, or the combination thereof.

In some embodiments, each expected session activity behavior parameter set of the one or more expected session activity behavior parameter sets is associated with a protocol data unit session identifier.

In various embodiments: the one or more expected session activity behavior parameter sets are one or more protocol data unit session level expected user equipment activity behavior parameter sets; and the expected user equipment behavior parameters set is a user equipment level expected user equipment behavior parameters set.

In one embodiment, a radio access network considers the one or more protocol data unit session level expected user equipment activity behavior parameter sets in response to user plane resources for a corresponding protocol data unit session being activated.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at an access and mobility management function comprising:
   receiving session management function derived core network assisted radio access network parameters from a session management function;
   storing the session management function derived core network assisted radio access network parameters in a protocol data unit session level context; and
   determining an expected session level activity behavior parameter set using the session management function derived core network assisted radio access network parameters;
   determining a user equipment level of expected user equipment behavior parameters set considering at least:
      expected user equipment behavior parameters or network configuration parameters received from a unified data management; and
      session management function derived core network assisted radio access network parameters associated with a protocol data unit session using control plane delivery optimization; and
   transmitting to a radio access network the user equipment level of expected user equipment behavior parameters set, one or more expected session level activity behavior parameter sets, or a combination thereof.

2. The method of claim 1, wherein the session management function derived core network assisted radio access network parameters are received during a protocol data unit session establishment procedure.

3. The method of claim 1, wherein the expected session level activity behavior parameter set is associated with a protocol data unit session identifier.

4. The method of claim 1, wherein the expected session level activity behavior parameter set is a protocol data unit session level expected user equipment activity behavior parameter set.

5. An apparatus comprising:
a receiver that is configured to receive session management function derived core network assisted radio access network parameters from a session management function;
a processor that is configured to:
store the session management function derived core network assisted radio access network parameters in a protocol data unit session level context;
use the session management function derived core network assisted radio access network parameters to determine an expected session user equipment activity behavior parameter set;
determine a user equipment level of expected user equipment behavior parameters set considering at least:
expected user equipment behavior parameters or network configuration parameters received from a unified data management; and
session management function derived core network assisted radio access network parameters associated with a protocol data unit session using control plane delivery optimization; and
a transmitter that is configured to transmit to a radio access network the user equipment level of expected user equipment behavior parameters set, one or more expected session activity behavior parameter sets, or a combination thereof.

6. The apparatus of claim 5, wherein the session management function derived core network assisted radio access network parameters are received during a protocol data unit session establishment procedure.

7. The apparatus of claim 5, wherein the expected session user equipment activity behavior parameter set is associated with a protocol data unit session identifier.

8. The apparatus of claim 5, wherein the expected session user equipment activity behavior parameter set is a protocol data unit session level expected user equipment activity behavior parameter set.

9. A method at a radio access network comprising:
receiving from an access and mobility management function:
an expected user equipment behavior parameters set;
one or more expected session user equipment activity behavior parameter sets; or
a combination thereof;
storing the expected user equipment behavior parameters set, the one or more expected session user equipment activity behavior parameter sets, or the combination thereof,
wherein the one or more expected session user equipment activity behavior parameter sets are one or more protocol data unit session level expected user equipment activity behavior parameter sets,
wherein the expected user equipment behavior parameters set is a user equipment level expected user equipment behavior parameters set; and
considering the one or more protocol data unit session level expected user equipment activity behavior parameter sets in response to user plane resources for a corresponding protocol data unit session being activated.

10. The method of claim 9, further comprising updating radio connection parameters of a radio access network based on the expected user equipment activity behavior parameters set, the one or more expected session user equipment activity behavior parameter sets, or the combination thereof.

11. The method of claim 9, wherein each expected session user equipment activity behavior parameter set of the one or more expected session user equipment activity behavior parameter sets is associated with a protocol data unit session identifier.

12. An apparatus comprising:
a receiver that is configured to receive from an access and mobility management function:
an expected user equipment behavior parameters set;
one or more expected session activity behavior parameter sets; or
a combination thereof; and
a processor that is configured to:
store the expected user equipment behavior parameter set, the one or more expected session activity behavior parameter sets, or the combination thereof,
wherein the one or more expected session activity behavior parameter sets are one or more protocol data unit session level expected user equipment activity behavior parameter sets,
wherein the expected user equipment behavior parameters set is a user equipment level expected user equipment behavior parameters set; and
consider the one or more protocol data unit session level expected user equipment activity behavior parameter sets in response to user plane resources for a corresponding protocol data unit session being activated.

13. The apparatus of claim 12, wherein the processor is further configured to update radio connection parameters of a radio access network based on the expected user equipment behavior parameter set, the one or more expected session activity behavior parameter sets, or the combination thereof.

14. The apparatus of claim 12, wherein each expected session activity behavior parameter set of the one or more expected session activity behavior parameter sets is associated with a protocol data unit session identifier.

15. The method of claim 1, wherein the expected user equipment behavior parameter set includes an information element indicating mobility behavior of a user equipment.

16. The apparatus of claim 5, wherein the expected user equipment behavior parameters set includes an information element indicating mobility behavior of a user equipment.

* * * * *